US007158773B2

(12) United States Patent
Kurita et al.

(10) Patent No.: US 7,158,773 B2
(45) Date of Patent: Jan. 2, 2007

(54) NOISE REDUCTION DEVICE AND WIRELESS LAN BASE STATION APPARATUS USING THE DEVICE

(75) Inventors: Shigeru Kurita, Kawasaki (JP); Yoshikazu Kobayashi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 502 days.

(21) Appl. No.: 10/686,667

(22) Filed: Oct. 17, 2003

(65) Prior Publication Data

US 2004/0102174 A1  May 27, 2004

(30) Foreign Application Priority Data

Nov. 21, 2002  (JP) ............................. 2002-338075

(51) Int. Cl.
  *H04B 1/10*  (2006.01)
  *H04B 17/00*  (2006.01)
(52) U.S. Cl. .................................. 455/307; 455/67.13
(58) Field of Classification Search ................ 455/307, 455/200.1, 501, 63.1, 67.13, 570, 575.7, 455/277.2, 296, 278.1; 343/715, 714; 342/381; 375/344, 346
See application file for complete search history.

(56) References Cited

U.S. PATENT DOCUMENTS 5,493,307 A * 2/1996 Tsujimoto .................... 342/381
5,818,517 A * 10/1998 Hudson et al. ............. 455/63.1
6,266,013 B1 * 7/2001 Stilp et al. .................... 342/387
6,882,868 B1 * 4/2005 Shattil ........................ 375/346
6,892,054 B1 * 5/2005 Belcher et al. ............. 455/63.1

FOREIGN PATENT DOCUMENTS

| JP | 4-252521    | 9/1992  |
| JP | 5-30443     | 2/1993  |
| JP | 5-241582    | 9/1993  |
| JP | 8-335915    | 12/1996 |
| JP | 2000-293965 | 10/2000 |
| JP | 2001-44739  | 2/2001  |

* cited by examiner

*Primary Examiner*—Aung Moe
(74) *Attorney, Agent, or Firm*—Young & Thompson

(57) ABSTRACT

A wireless LAN base station is provided with a noise signal scanning antenna separately from a wireless signal reception antenna. An attenuation circuit section attenuates the received signal from the noise scanning antenna according to an attenuation factor from an attenuation factor storage section. A distance setting storage section stores a distance between the wireless signal reception antenna and the noise scanning antenna. An attenuation factor storage section holds pieces of data each of which indicates the relationship between the distance between the antennas and an attenuation factor in the form of a table. An attenuation circuit section employs the attenuation factor so as to attenuate the received signal from the noise signal scanning antenna. A subtraction circuit section subtracts an output signal of the attenuation circuit section from the signal from the wireless signal reception antenna, and reduces or eliminates a noise from the received signal from the wireless signal reception antenna.

22 Claims, 12 Drawing Sheets

| ATTENUATION FACTOR Cn | | NOTES |
|---|---|---|
| C0 | 0 | |
| C1 | 0.1 | |
| C2 | 0.2 | |
| C3 | 0.3 | |
| C4 | 0.4 | |
| C5 | 0.5 | |
| C6 | 0.6 | |
| C7 | 0.7 | |
| C8 | 0.8 | |
| C9 | 0.9 | |
| C10 | 1.0 | Max |

NOISE REDUCTION DEVICE AND WIRELESS LAN BASE STATION APPARATUS USING THE DEVICE

BACKGROUND OF THE INVENTION

1. Field of the Invention

The present invention relates to a noise reduction device which reduces or eliminates a noise of a wireless signal received by a wireless communication unit. More particularly, the invention relates to a noise reduction device suited for reducing or eliminating a noise in a wireless network or the like in a bad communication environment and a wireless LAN base station apparatus using the noise reduction device.

2. Description of the Related Art

Conventionally, various types of systems that hold wireless communications are faced with unavoidable noise influence problems. Recently, a wireless LAN system has been developed. This system connects a server to a personal computer and allows the personal computer to hold data communication or the like.

In the system of this type, the personal computer is disposed in the interior of a building and the wireless LAN base station is also disposed in the same interior. Due to this, the wireless LAN base station is often located adjacent various noise sources employed in the interior. Examples of the noise sources employed therein include home electric appliances. If the wireless LAN bas station is disposed, in particular, adjacent a noise source that generates a noise at a frequency in a band equal to a frequency band of the wireless LAN base station, a wireless environment is disadvantageously deteriorated. Examples of the home electric appliance that generates a noise in a frequency band equal to that of the wireless LAN base station include a microwave oven. The wireless LAN base station is often disposed in the vicinity of the microwave oven.

As a conventional noise prevention method for the wireless LAN system, there is known a diversity system. According to this diversity system, two antennas are employed and a signal is received from one of the antennas that has a better sensitivity.

Further, as described in Japanese Patent Publication No. 2000-293965 A (paragraphs 0011 to 0013 and FIG. 1), a noise that is estimated to occur is sampled in advance and the sampled noise is written to a nonvolatile memory. When a noise occurs, the sampled noise is read from the memory and the noise is subtracted from a voice signal into which the noise of the same type is mixed.

However, the conventional diversity system is not intended to reduce a noise. For this reason, if a noise source is located near a wireless communication unit or system, the wireless communication unit or the system is influenced by a noise, with the result that the diversity system is disadvantageously incapable of attaining a noise reduction effect.

Furthermore, in the method described in Japanese Patent Publication No. 2000-293965 A, the noise reduction effect can be attained only for the noise that is estimated in advance. If the location of the device is moved, etc. and a noise other than the estimated noise is mixed into a signal, the method is disadvantageously incapable of attaining the noise reduction effect.

SUMMARY OF THE INVENTION

The present invention has been achieved in light of the conventional disadvantages. It is, therefore, an object of the invention to provide a noise reduction device capable of ensuring the reduction or elimination of a noise according to an installation environment of a device or a system, irrespective of an installation location of the device or the system and to provide a wireless LAN base station apparatus using the noise reduction device.

According to a first aspect of the invention, there is provided a noise reduction device comprising: a first antenna which receives a wireless signal; a second antenna for noise scanning; means for setting an optimum attenuation factor according to a distance between the first antenna and the second antenna; means for attenuating a received signal from the second antenna at the optimum attenuation factor; and means for subtracting an output signal of the attenuation means from the received signal from the first antenna, and for thereby reducing a noise of the received signal from the first antenna.

According to a second aspect of the invention, there is provided a noise reduction device comprising: a first antenna which receives a wireless signal; a second antenna for noise scanning; a table which stores data indicating a relationship between a distance between the first antenna and the second antenna and an attenuation factor; means for setting the distance between the first antenna and the second antenna; means for attenuating a received signal from the second antenna at the attenuation factor which is stored in the table and which corresponds to the set distance; and means for subtracting an output signal of the attenuation means from the received signal from the first antenna, and for thereby reducing a noise of the received signal from the first antenna.

According to a third aspect of the invention, there is provided a noise reduction device comprising: a first antenna which receives a wireless signal; a second antenna for noise scanning; means for setting an optimum attenuation factor according to a distance between the first antenna and the second antenna; means for attenuating a received signal from the second antenna at the optimum attenuation factor; and means for subtracting an output signal of the attenuation means from the received signal from the first antenna, and for thereby reducing a noise of the received signal from the first antenna, characterized in that the optimum attenuation factor setting means measures an error occurrence rate of an output signal of the subtraction means while changing the attenuation factor of the attenuation means, and sets an attenuation factor, at which the measured error occurrence rate is a lowest rate, as the optimum attenuation factor.

According to a fourth aspect of the invention, there is provided noise reduction device comprising: a first antenna which receives a wireless signal; a second antenna for noise scanning; means for detecting a level difference between a peak of the received signal from the first antenna and a peak of a received signal from the second antenna; means for calculating an attenuation factor based on the detected level difference; means for attenuating the received signal from the second antenna at the attenuation factor calculated by the calculation means; and means for subtracting an output signal of the attenuation means from the received signal from the first antenna, and for thereby reducing a noise of the received signal from the first antenna.

According to a fifth aspect of the invention, there is provided a noise reduction device comprising: a first antenna which receives a wireless signal; a second antenna for noise scanning; a third antenna for noise transmission; means for generating a signal having an reverse phase to a phase of a noise signal received at the second antenna for noise scanning; and means for transmitting the generated reverse-phase signal from the third antenna for noise transmission, and thereby canceling a noise component of the received signal at the first antenna.

According to a sixth aspect of the invention, there is provided a noise reduction device comprising: a first antenna which receives a wireless signal; means for generating a spurious-signal; a second antenna which transmits the spurious-signal; a third antenna which is provided near the second antenna and which receives the spurious-signal transmitted from the second antenna; means for detecting a level difference between the signal received at the first antenna and the signal received at the third antenna; means for setting an optimum attenuation factor according to the detected level difference; means for attenuating the received signal from the third antenna at the optimum attenuation factor; and means for subtracting an output signal of the attenuation means from the received signal from the first antenna, and for thereby reducing a noise of the received signal from the first antenna.

According to a seventh aspect of the invention, there is provided a noise reduction device comprising: a first antenna which receives a wireless signal; a second antenna for noise scanning; means for setting an optimum attenuation factor according to a distance between the first antenna and the second antenna; first peak detection means for detecting a peak of the received signal from the first antenna; second peak detection means for detecting a peak of a received signal from the second antenna; means for comparing the peak detected by the first peak detection means with the peak detected by the second peak detection means; means for extracting a noise component from the received signal having the higher peak based on a comparison result of the comparison means; means for attenuating the extracted noise component at the optimum attenuation factor; and means for subtracting an output signal of the attenuation means from the received signal from the first antenna, and for thereby reducing a noise of the received signal from the first antenna.

According to an eighth aspect of the invention, there is provided a wireless LAN base station apparatus comprising the noise reduction device according to any one of the above-stated noise reduction devices.

DESCRIPTION OF THE PREFERRED EMBODIMENTS

Embodiments of the present invention will be described hereinafter in detail with reference to the drawings. In the embodiments below, it is assumed that a noise reduction device according to the invention is used in the above-stated wireless LAN system. The wireless LAN system, as already described, connects a server to a personal computer by a wireless network and allows the personal computer to hold data communication or the like through a wireless or wired network. In the embodiments below, it is assumed that a wireless LAN base station that constitutes the wireless LAN network is disposed in the interior of a building and the noise reduction device according to the invention is used in this wireless LAN base station, thereby improving a wireless environment deteriorated by a noise source.

First Embodiment

Figure 1:
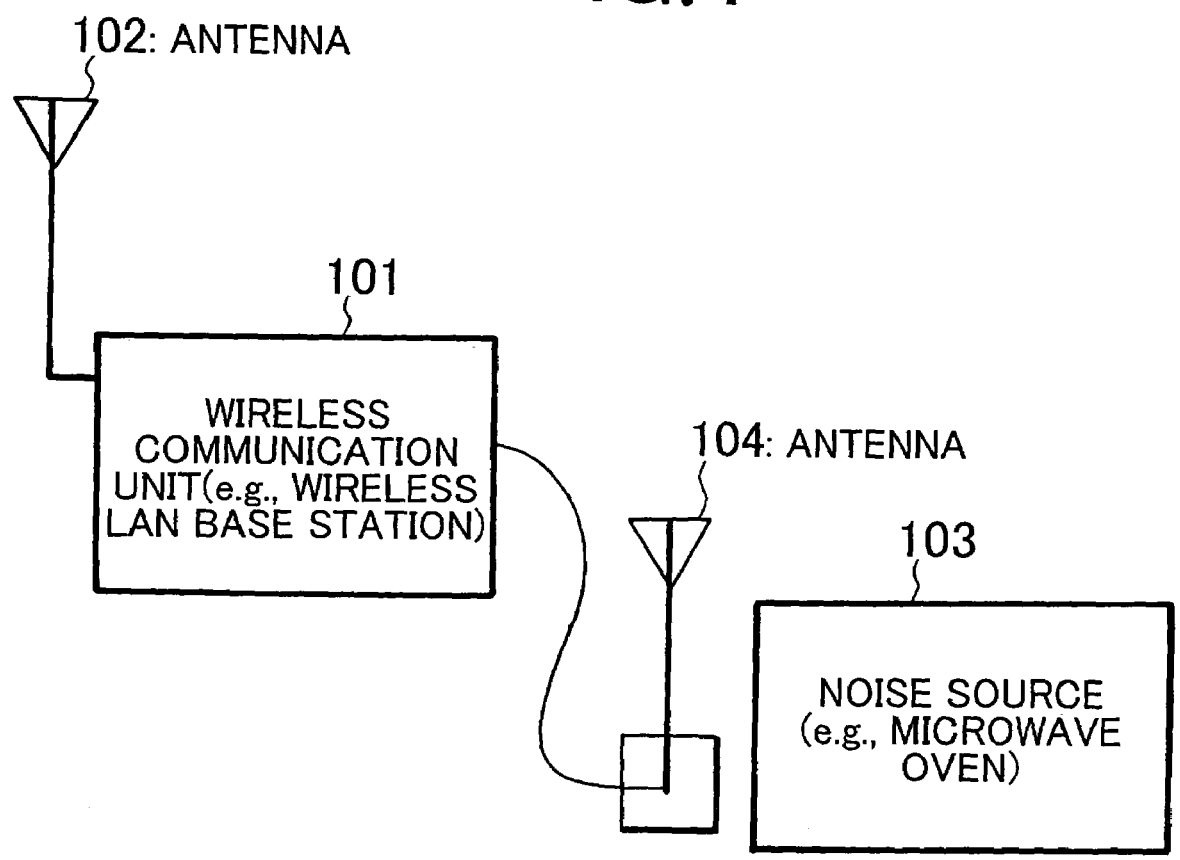
FIG. 1 is a schematic block diagram illustrating a wireless LAN base station including a noise reduction device according to the present invention and a noise source.

FIG. 1 is a schematic block diagram illustrating the configuration of the noise reduction device in the first embodiment according to the present invention. In FIG. 1, reference numeral 101 denotes a wireless communication unit which includes an antenna 102 and the wireless communication unit 101 is assume as a wireless LAN base station as stated above. Reference numeral 103 denotes a noise source and the noise source 103 is assumed as a microwave oven which generates a noise in a frequency band equal to that of the wireless LAN. It is assumed herein that the wireless communication unit 101 is installed in the interior of a building and that the noise source, that is, microwave oven 103 is disposed in the vicinity of the wireless communication unit 101 in the same interior. The wireless communication unit 101 is provided with a noise signal scanning antenna 104 separately from the wireless signal reception antenna 102. The antenna 104 is disposed as near as the noise source 103.

Figure 2:
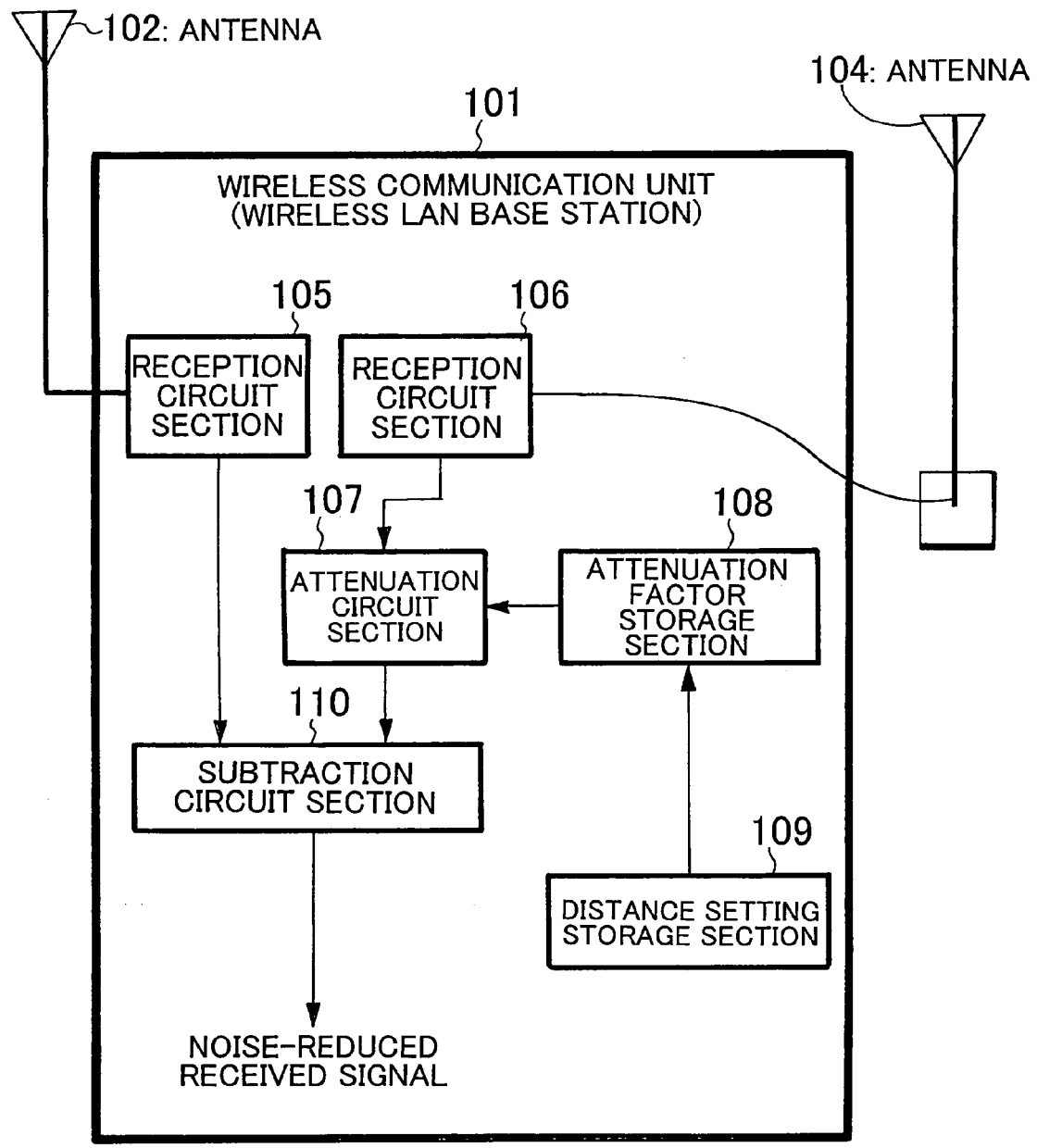
FIG. 2 is a block diagram illustrating the first embodiment according to the invention.

FIG. 2 is a block diagram illustrating the configuration of the wireless communication unit 101 shown in FIG. 1. The wireless communication unit (i.e., wireless LAN base station) 101 shown in FIGS. 1 and 2 is equal in configuration to the conventional wireless LAN base station. In FIG. 2, therefore, the entire configuration of the wireless communication unit 101 is not shown but only part of the configuration related to noise reduction is shown. The same shall apply hereafter. In FIG. 2, reference numeral 105 denotes a reception circuit section that receives a wireless signal from the wireless signal reception antenna 102, and 106 denotes a reception circuit section that receives a wireless signal from the noise scanning antenna 104. The reception circuit sections 105 and 106 amplify the received signals from the antennas 102 and 104 and outputs the amplified signal. It is assumed that the reception circuit sections 105 and 106 are equal in amplification factor. Reference numeral 107 denotes an attenuation circuit section that attenuates the received signal of the reception circuit section 106 according to an attenuation factor from an attenuation factor storage section 108. Reference numeral 109 denotes a distance setting storage section that stores a distance between the antennas 102 and 104.

The distance between the antennas 102 and 104 is measured in advance and the measurement result is set in the distance setting storage section 109. In addition, the attenuation factor storage section 108 holds pieces of data each of which indicates the relationship between the distance between the antennas 102 and 104 and an attenuation factor in the form of a table. The attenuation circuit section 107 employs the attenuation factor corresponding to the antenna distance set in the distance setting storage section 109 among those in the table of the attenuation factor storage section 108 so as to attenuate the received signal of the reception circuit section 106. Reference numeral 110 denotes a subtraction circuit section. The subtraction circuit section 110 subtracts an output signal of the attenuation circuit section 107 from the signal of the reception circuit section 105 that receives the wireless signal from the antenna 102, and reduces or eliminates a noise from the received signal from the antenna 102.

The operation of the noise reduction device in the first embodiment will next be described. A wireless signal from the antenna 102 is received by the reception circuit section 105 whereas a noise signal from the antenna 104 is received by the reception circuit section 106. The signals are amplified at predetermined amplification factors, respectively. In this case, the antenna 104 receives a noise from the noise source 103. Due to this, in order to reduce or eliminate the noise mixed into the received signal of the antenna 102, the noise received at the antenna 104 may be subtracted from the received signal of the antenna 102. However, since a distance between the antenna 102 and the noise source 103 is larger than a distance between the antenna 104 and the noise source 103, the level of the noise mixed into the received signal of the antenna 102 is lower than the level of the noise received at the antenna 104.

In this embodiment, the noise signal from the antenna 104 is attenuated at a preset attenuation factor, i.e., an attenuation factor according to the distance between the antennas 102 and 104. A noise component of the wireless signal from the antenna 102 is reduced or eliminated by subtracting the attenuated noise signal from the received signal from the antenna 102 that receives the wireless signal.

To be specific, the attenuation circuit section 107 attenuates the noise signal of the reception circuit section 106 that receives the signal from the antenna 104 at the preset attenuation factor. That is, the attenuation circuit section 107 attenuates the signal of the reception circuit section 106 at the preset attenuation factor C stored in the attenuation factor storage section 108 and outputs the attenuated signal to the subtraction circuit section 110. The preset attenuation factor C is obtained by measuring the distance between the antennas 102 and 104 in advance and setting the measured distance in the distance setting storage section 109 at the time of disposing the antenna 104.

The attenuation factor varies according to antenna characteristics. Due to this, the antennas 102 and 104 to be used are set in advance, a correlation of the distances between the antennas 102 and 104 with an attenuation factor is measured using the antennas 102 and 104 thus set, and the correlation data is stored in the table of the attenuation factor storage section 108. Accordingly, the attenuation circuit 107 attenuates the signal of the reception circuit section 106 using the attenuation factor that corresponds to the distance between the antennas 102 and 104 set in the distance setting storage section 109 among the attenuation factors in the table of the attenuation factor storage section 108.

The subtraction circuit section 110 subtracts the signal of the attenuation circuit section 107 from the signal of the reception circuit section 105 that receives the wireless signal from the antenna 102, thereby reducing or eliminating the noise of the wireless signal from the antenna 102. It is assumed herein that an output signal level of the reception circuit section 105 that receives the signal from the antenna 102 is A, an output signal level of the reception circuit section 106 that receives the signal from the antenna 104 is B and that the preset attenuation factor is C. An output signal level D of the subtraction circuit section 110 from which the noise is either reduced or eliminated is given by the following equation (1):

$$D = A - (B \times C) \quad (1)$$

The table that stores relationships between the distances between the antennas and the attenuation factors is made before shipping the device from a factory. An example of the table making method is as follows. A transmission source that is supposed as the noise source 103 is disposed in close proximity to the antenna 104 and the reception sensitivity of the antenna 102 is measured while changing the distance between the antennas 102 and 104. At this time, if the reception sensitivity of the antenna 104 is assumed at 1, that of the antenna 102 is equal to or lower than 1. This reception sensitivity of the antenna 102 is regarded as the attenuation factor.

Specifically, the distance between the antennas 102 and 104 is changed to, for example, 1 m, 5 m, and 10 m and the reception sensitivities of the antenna 102 for the respective distances are measured. It is assumed herein that the reception sensitivity of the antenna 104 is 1.0 and that the reception sensitivities of the antenna 102 for the respective distances are 0.9, 0.5, and 0.1. In this case, the attenuation factor at the distance of 1 m is 0.9, that at the distance of 5 m is 0.5, and that at the distance of 10 m is 0.1. The table that indicates the relationships between the distances and the attenuation factors is made as stated above, the made table is stored in a memory of the attenuation factor storage section 108, and the device is then shipped.

Meanwhile, if the wireless LAN base station 101 is disposed, the distance between the antennas 102 and 104 is measured by, for example, an installer and the measurement result is set in the distance setting storage section 109. In this case, if the noise source such as the microwave oven is provided in the interior of a building, it is preferable to dispose the antenna 104 at a position as near as the noise source. For brevity of description, three distances between the antennas are used in the making of the table. Preferably, the distances are set more minutely.

As can be seen, in the first embodiment, the noise scanning antenna is provided separately from the wireless signal reception antenna. The received signal from the noise scanning antenna is attenuated at the attenuation factor determined according to the distance between the wireless signal reception antenna and the noise scanning antenna, and the resultant attenuated signal is subtracted from the received signal of the wireless signal reception antenna. Therefore, a noise component contained in the wireless signal can be reduced or eliminated even in a wireless network or the like in a bad communication environment in which the noise source is present, and good communication can be ensured.

Second Embodiment

Figure 3:
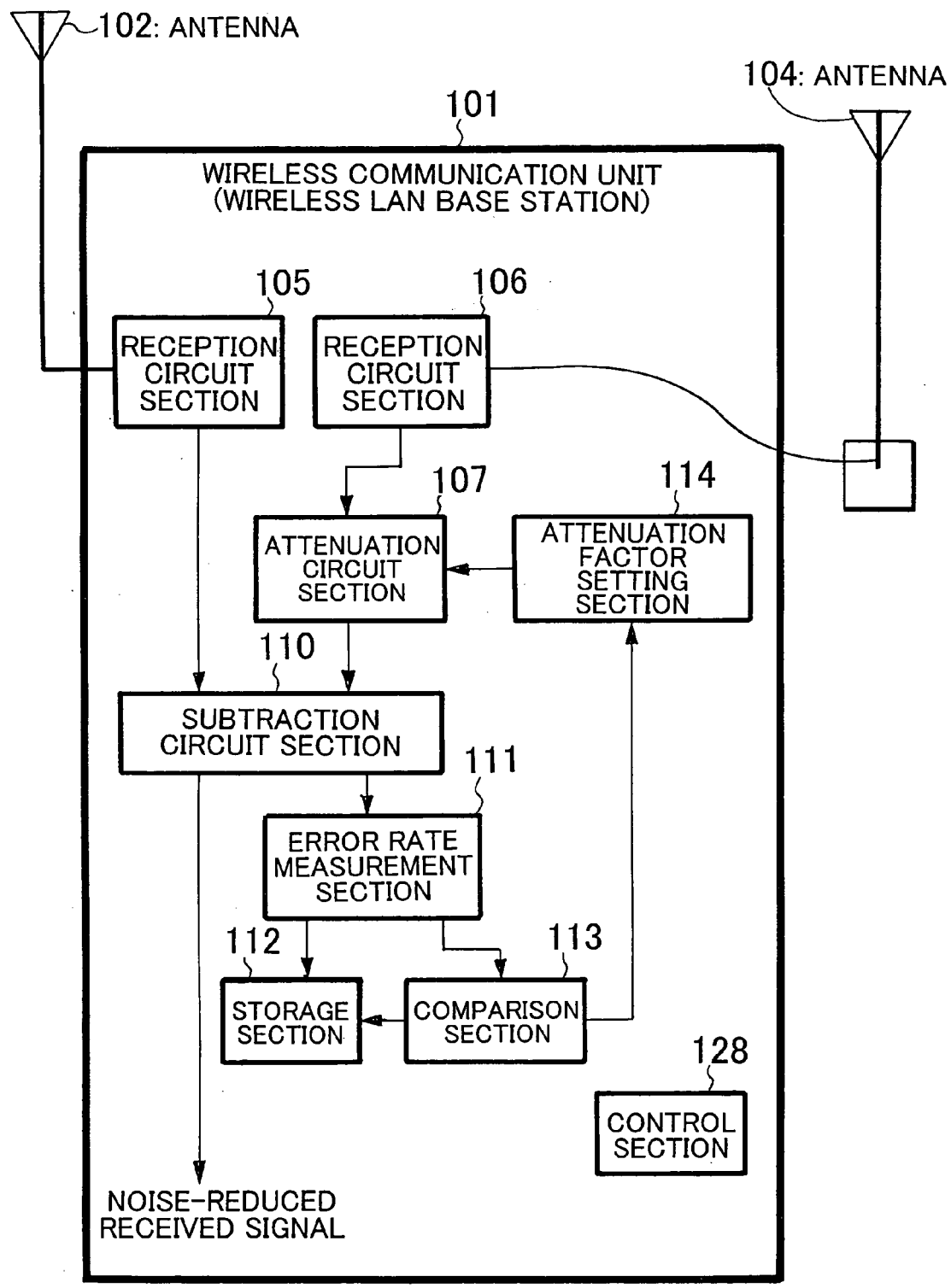
FIG. 3 is a block diagram illustrating the second embodiment according to the invention.

FIG. 3 is a block diagram illustrating the second embodiment according to the present invention. The first embodiment requires a labor of setting the distance between the antennas 102 and 104. In the second embodiment, by contrast, an error occurrence rate (hereinafter "error rate") is used to set an optimum attenuation factor, thereby dispensing with the labor of distance setting. In FIG. 3, the same sections as those shown in FIG. 2 are denoted by the same reference numerals, which sections will not be described herein. The relationship between the noise scanning antenna 104 and the noise source 103 is equal to that in the first embodiment.

In this embodiment, the configuration of the unit 101 from the antenna 102 to the subtraction circuit section 110 and that from the wireless signal reception antenna 104 to the subtraction circuit section 110 are equal to those in the first embodiment. As will be described later in detail, an error rate measurement section 111 measures an error rate of a received signal output from the subtraction circuit section 110 while changing the attenuation factor of the attenuation circuit section 107, and an optimum attenuation factor according to the distance between the antennas 102 and 104 is set based on the measurement result. A storage section 112 and a comparison section 113 are employed for this optimum attenuation factor setting. Reference numeral 128 denotes a control section that controls the respective constituent sections of the wireless communication unit 101. The control section 128 controls the respective sections and thereby performs an optimum attenuation factor setting processing.

Figure 4:
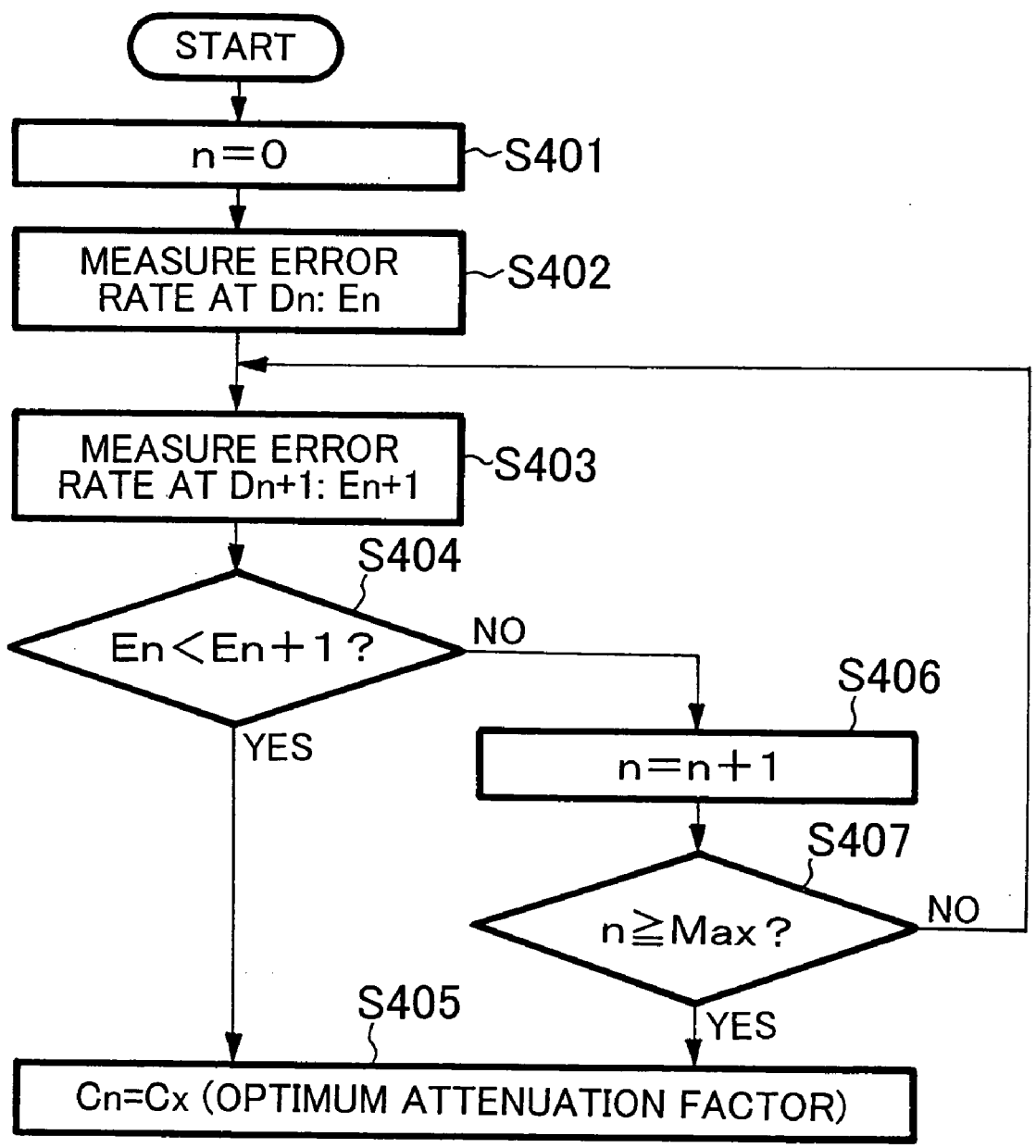
FIG. 4 is a flow chart illustrating one example of an attenuation factor setting processing in the second embodiment.
Figures 5, 6:
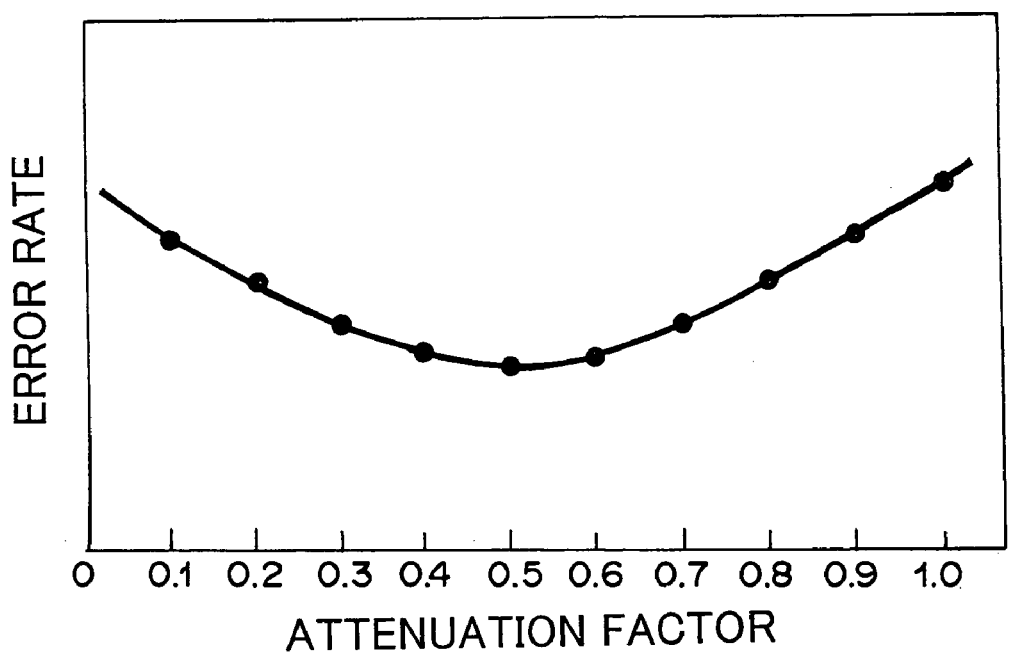
FIG. 5 illustrates an example of the setting of attenuation factors in the second embodiment.
FIG. 6 is a graph illustrating a relationship between an attenuation factor and an error rate in the second embodiment.

FIG. 4 is a flow chart illustrating one example of the attenuation factor setting processing in this embodiment. The processing shown in FIG. 4 is carried out when the wireless communication unit 101 that is a wireless LAN base station is disposed at a predetermined location and the antenna 104 is disposed at a predetermined location. The antenna 104 is preferably provided near the noise source. It is assumed herein that n is a variable that ranges from, for example, 0 to 10 (n=0 to 10). First, the variable n is set at an initial value of 0 (n=0) (in a step S401). Attenuation factors are set to change by predetermined values. As shown in FIG. 5, for example, the attenuation factors are set by 0.1's and an attenuation factor Cn is set at 0 to 1.0 (Cn=0~1.0).

Next, the lowest attenuation factor (Cn=0 corresponding to the variable n=0) is set in the attenuation factor setting section 114. The attenuation circuit section 107 attenuates the output signal of the reception circuit section 106 using the attenuation factor Cn=0. Similarly to the first embodiment, the subtraction circuit section 110 subtracts the output signal of the attenuation circuit section 107 from the output signal of the reception circuit section 105. Differently from the first embodiment, however, an error rate En for an output Dn of the subtraction circuit section 110 at the attenuation factor Cn=0 is measured by the error rate measurement section 111, and the measurement result is stored in the storage section 112 (in a step S402). An error rate measurement method will be described later.

The attenuation factor is increased by one step and the attenuation factor Cn=0.1 (n=1) is set in the attenuation factor setting section 114. Similarly to the step S402, an error rate En+1 for an output Dn+1 of the subtraction circuit section 110 at the attenuation factor Cn=0.1 is measured by the error rate measurement section 111, and the measurement result is stored in the storage section 112 (in a step S403). The comparison section 113 compares the error rate En with the error rate En+1 to determine whether a relationship of En<En+1 is satisfied (in a step S404). If the comparison section 113 determines that En and En+1 satisfies a relationship of En<En+1, the previous attenuation factor Cn=0 is set as an optimum attenuation factor Cx and the processing is finished (in a step S405).

On the other hand, if the comparison section 113 determines that the relationship of En<En+1 is not satisfied, it is determined that the optimum attenuation factor cannot be obtained and the processing goes to a step S406 and the variable n is set at n+1 (n=n+1) in the step S406. Next, it is determined whether a relationship of n≧MAX (maximum) is satisfied (in a step S407). Since the variable n at this time is not the maximum, the processing returns to the step S403 and the same processing is carried out in the step 403 and the following steps. Namely, the attenuation factor is increased by one step to Cn=0.2 (n=2), and the error rate measurement section 111 measures an error rate En+2 for an output Dn+2 of the subtraction circuit section 110 at the attenuation factor Cn=0.2 (in the step S403).

The comparison section 113 compares the error rate En+1 at the previous attenuation factor Cn=0.1 with the error rate En+2 at the present attenuation factor Cn=0.2 (in the step S404). If the comparison section 113 determines that the relationship of En+1<En+2 is satisfied, the previous attenuation factor Cn=0.1 is set as the optimum attenuation factor Cx (in the step S405). If the comparison section 113 determines that the relationship of En+1<En+2 is not satisfied, it is determined that the optimum attenuation factor cannot be obtained and the processing proceeds to the step S406 and the following steps.

Thereafter, the attenuation factor is increased one step by one step of Cn=0.3, 0.4, 0.5, etc. and the processing in the steps S403 to S407 is repeatedly carried out and the processing is finished when the optimum attenuation factor Cx can be obtained. If the optimum attenuation factor cannot be attained at n=MAX in the step S407, the attenuation factor corresponding to n=MAX is set as the optimum attenuation factor and the processing is finished.

FIG. 6 is a graph illustrating the relationship between the attenuation factor and the error rate. In this embodiment, the error rate is measured while changing the attenuation factor as shown in FIG. 6 and the optimum attenuation factor is set based on the result of the comparison of the error rate at the previous attenuation factor with that at the present attenuation factor.

The error rate measurement method will now be described. To measure the error rate, the following two methods can be used. The first method is as follows. Since a CRC check pit is present in a wireless LAN frame, the presence/absence of an error can be determined by checking this pit. Accordingly, the number of error frames per unit time is counted, thereby checking an error frequency and measuring an error rate.

The second method is as follows. If a packet transmitted from the wireless LAN base station apparatus 101 to a terminal (not shown) can be normally received by the terminal, the terminal transmits a response to the wireless LAN base station apparatus 101. If the terminal cannot receive the packet normally or the base station cannot receive the response from the terminal, it is determined that there is no response from the terminal. If no response is transmitted, the base station side performs a retransmission processing. At this time, by counting the number of times of retransmission per unit time, the error frequency can be checked and the error rate can be measured. This error rate measurement method can be used in the later embodiments. Needless to say, various other methods can be used to measure the error rate.

As can be seen, in the second embodiment, it is possible to automatically set the optimum attenuation factor while dispensing with the labor of setting the distance between the antennas as required in the first embodiment. In addition, it is possible to optimally reduce the noise without being conscious of the level of the noise mixed into the antenna 104.

Third Embodiment

The third embodiment according to the present invention will be described. In the third embodiment, even if the noise level of the noise source changes or the location of the wireless communication unit 101 is moved, an optimum attenuation factor is updated regularly so as to be able to always, optimally reduce a noise. The wireless communication unit 101 in this embodiment is equal in configuration to the wireless communication unit 101 in the second embodiment shown in FIG. 3. In addition, similarly to the second embodiment, it is assumed that the variable n ranges from 0 to 10 (n=1 to 10), the attenuation factor changes by 0.1's as shown in FIG. 5 and that the attenuation factor Cn is set at 0 to 1.0 (Cn=0 to 1.0).

Figure 7:
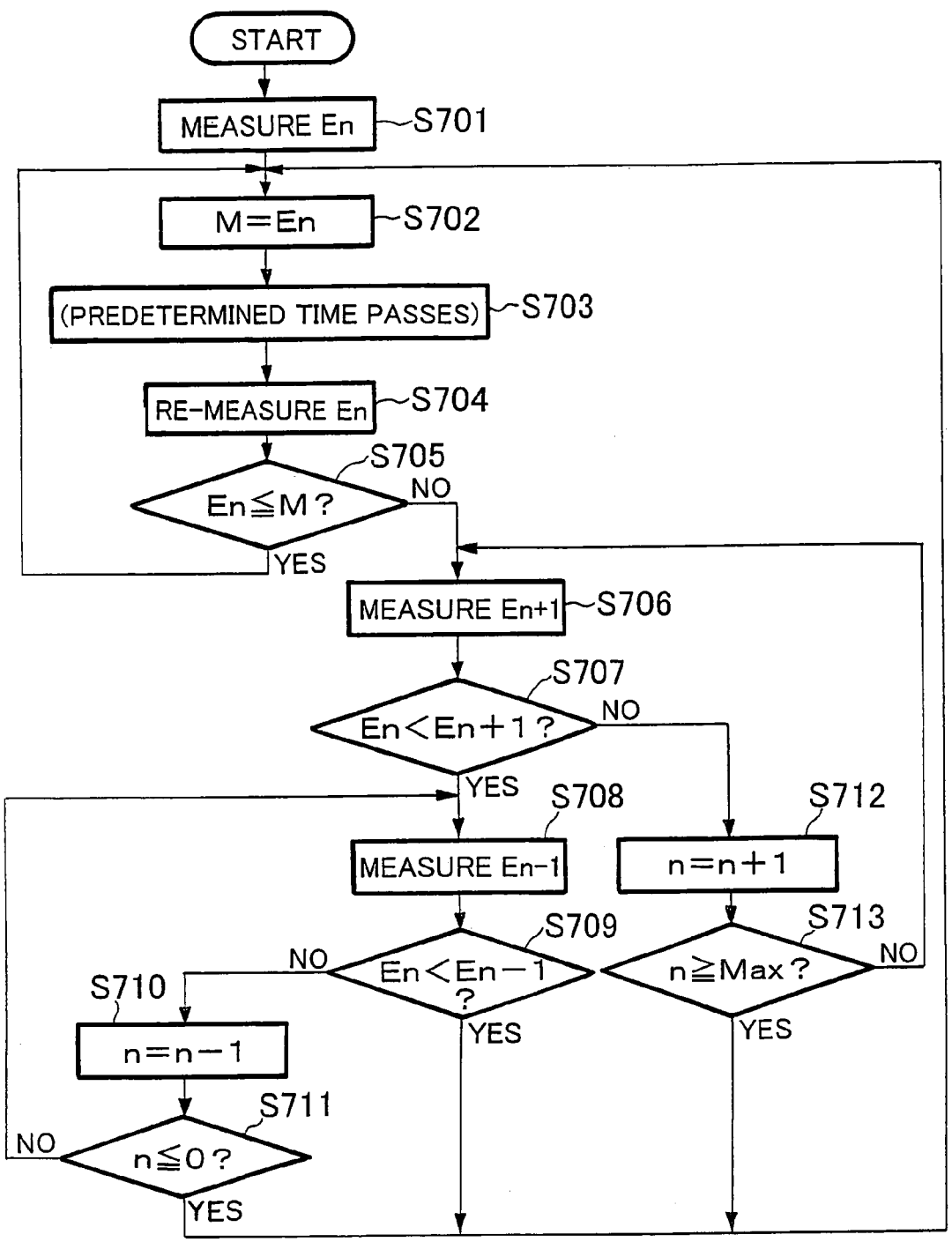
FIG. 7 is a flow chart illustrating an attenuation factor setting processing in the third embodiment according to the invention.

FIG. 7 is a flow chart illustrating an attenuation factor setting processing in this embodiment. In this embodiment, after the end of the attenuation factor setting processing in the second embodiment shown in FIG. 4, a processing shown in FIG. 7 is regularly carried out to update the attenuation factor so as to obtain an optimum attenuation factor. It is noted that the processing shown in FIG. 7 is carried out during the operation of the wireless communication unit 101 by setting a predetermined time for the processing such as a five minutes or a ten minutes.

In FIG. 7, numeral En in a step S701 denotes an error rate corresponding to the optimum attenuation factor set in the step S405 shown in FIG. 4. Next, M=En is set (in a step S702) and the passage of predetermined time (e.g., five minutes) is awaited (in a step S703). When the predetermined time passes, the error rate measurement section 111 measures the error rate En for an output of the subtraction circuit section 110 and stores the measurement result in the storage section 112 (in a step S704). The error rate is measured by using the error rate measurement methods mentioned above. The comparison section 113 compares the previous error rate M with the present error rate En (in a step S705). If the comparison section 113 determines that a relationship of En$\leq$M is satisfied, the previous attenuation factor is held and the processing starting at the step S702 is carried out.

If the comparison section 113 determines in the step S705 that the relationship of En$\leq$M is not satisfied, the error rate En+1 at the attenuation factor that is increased by one step is measured (in a step S706). If the previous variable n is, for example, 5 (n=5), the attenuation factor corresponding to n+1=6 is set and the error rate En+1 at the attenuation factor is measured. Next, the comparison section 113 compares the previous error rate En with the present error rate En+1 (in a step S707). If the comparison section 113 determines that a relationship of En<En+1 is satisfied, an error rate En−1 at the attenuation factor that is decreased by one step is measured (in a step S708). If the previous variable n is, for example, 5 (n=5), the attenuation factor corresponding to n−1=4 is set and the error rate En−1 at the attenuation factor is measured.

Thereafter, the comparison section 113 compares the previous error rate En with the present error rate En−1 (in a step S709). If the comparison section 113 determines that a relationship of En<En−1 is satisfied, the attenuation factor for the variable n=5 is set as the optimum attenuation factor and the processing starting at the step S702 is carried out again. If the comparison section 113 determines in the step S709 that the relationship of En<En−1 is not satisfied, n=n−1 is set (in a step S710) and it is determined whether n satisfies a relationship of n$\leq$0 (in a step S711). If it is determined whether n does not satisfy the relationship of n$\leq$0, the processing starting at the step S708 is carried out again. Namely, the processing in the steps S708 to S711 is carried out, and the attenuation factor is decreased one step by one step. When the relationship of En<En−1 is satisfied in the step S709, the attenuation factor corresponding to n−1 is set as the optimum attenuation factor.

On the other hand, if it is determined in the step S707 that the relationship of En<En+1 is not satisfied, n=n+1 is set oppositely to the step S710 (in a step S712) and it is determined whether n satisfies a relationship of n$\geq$MAX (in a step S713). If it is determined that n does not satisfy n$\geq$MAX, the processing starting at the step S706 is carried out again. That is to say, the error rate is measured while increasing the attenuation factor one step by one step. When the relationship of En<En+1 is satisfied in the step S707, the processing after the step S708 is similarly carried out and the attenuation factor is set.

By regularly executing the processing shown in FIG. 7, the optimum attenuation factor is set so as to always minimize the error rate. As stated above, in this embodiment, the attenuation factor is always set at the optimum attenuation value. Therefore, even if, for example, the noise level changes or the wireless communication unit 101 moves, it is possible to always, optimally reduce the noise.

Fourth Embodiment

Figure 8:
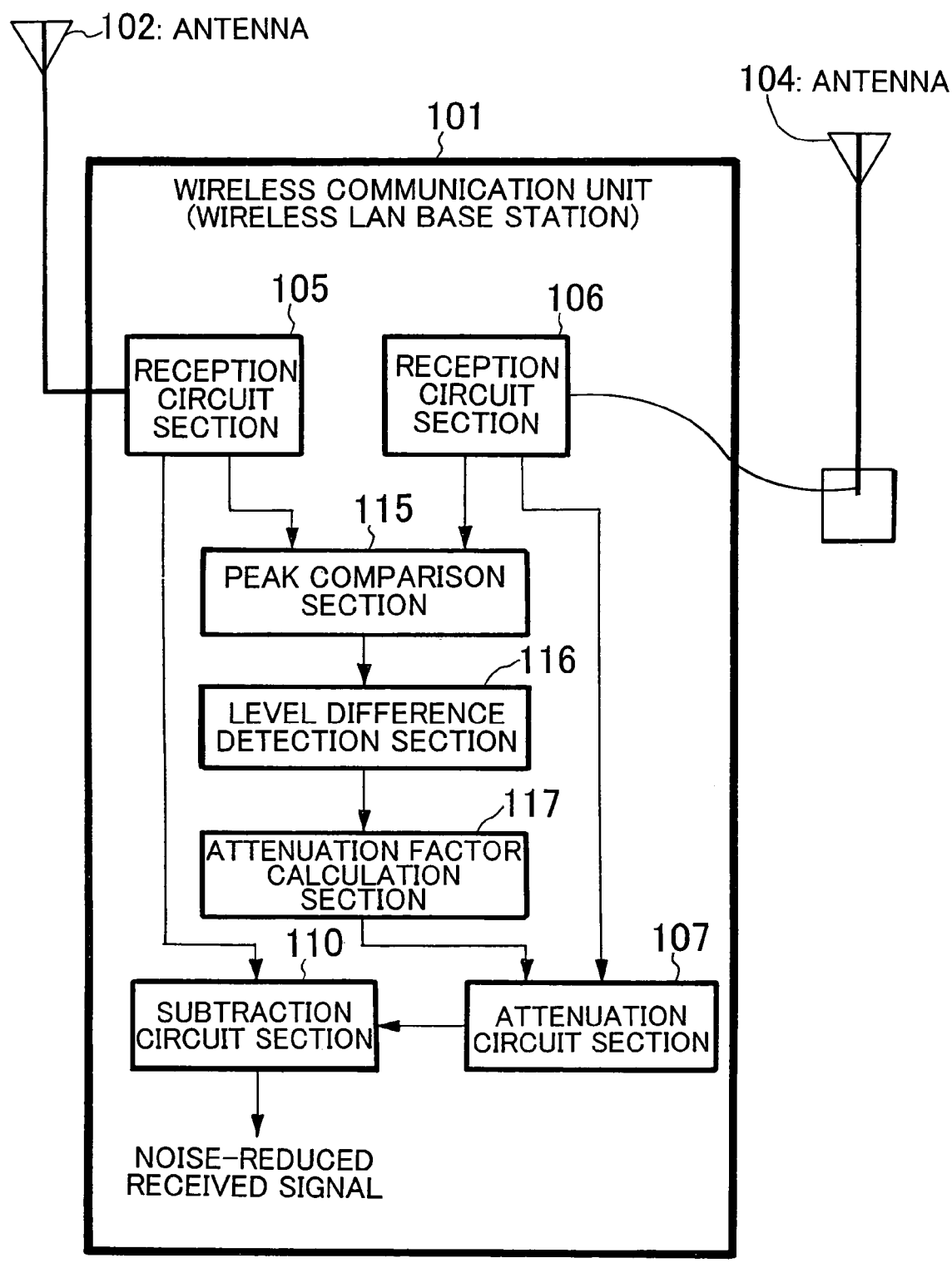
FIG. 8 is a block diagram illustrating the fourth embodiment according to the invention.

FIG. 8 is a block diagram illustrating the fourth embodiment according to the present invention. In FIG. 8, the same sections as those shown in FIGS. 2 and 3 are denoted by the same reference numerals, which sections will not be repeatedly described herein. In the fourth embodiment, a peak comparison section 115 compares a peak of a received signal of the reception circuit section 105 with a peak of a received signal of the reception circuit section 106, and a level difference detection section 116 detects a level difference between the peaks. An attenuation factor calculation section 117 calculates an attenuation factor based on the obtained level difference. For example, if the peak of the received signal of the reception circuit section 105 is half the peak of the received signal of the reception circuit section 106, the attenuation factor is 0.5.

The remaining configuration is equal to that shown in FIGS. 2 and 3. The attenuation circuit section 107 attenuates the received signal of the reception circuit section 106 using the obtained attenuation factor. The subtraction circuit section 110 subtracts an output signal of the attenuation circuit section 107 from the received signal of the reception circuit section 105 and thereby outputs a signal from which a noise is reduced or eliminated. In the fourth embodiment, the attenuation factor can be easily calculated.

Fifth Embodiment

Figure 9:
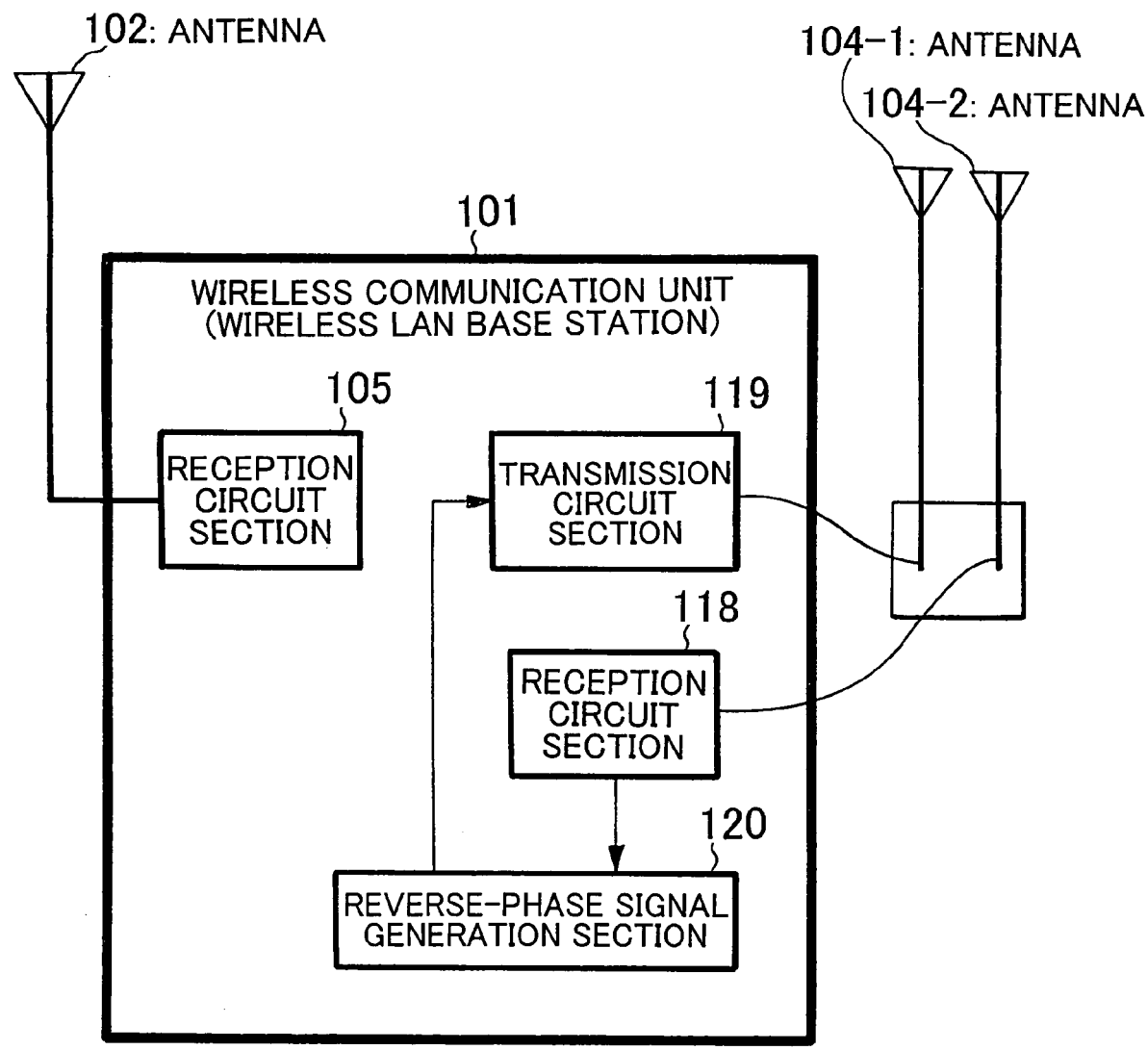
FIG. 9 is a block diagram illustrating the fifth embodiment according to the invention.

FIG. 9 is a block diagram illustrating the fifth embodiment according to the present invention. In FIG. 9, the same sections as those shown in FIGS. 2 and 3 are denoted by the same reference numerals, which sections will not be repeatedly described herein. In this embodiment, a noise is reduced or eliminated without using an attenuation factor. In FIG. 9, reference numerals 104-1 and 104-2 denote antennas both disposed near a noise source. The antenna 104-1 is a transmission antenna and the antenna 104-2 is a reception antenna.

A received signal from the reception antenna 104-2 is received by a reception circuit section 118 and output to an reverse-phase signal generation circuit section 120. The reverse-phase signal generation circuit section 120 generates a signal in reverse-phase to the received signal and outputs the reverse-phase signal to a transmission circuit section 119. The transmission circuit section 119 transmits this reverse-phase signal from the transmission antenna 104-1. The transmitted signal is received at the antenna 102. At the time of reception of the signal, a received noise is cancelled by the reverse-phase signal from the transmission antenna 104-1. Therefore, even if the noise source is present, the noise can be reduced or eliminated similarly to the preceding embodiments.

Sixth Embodiment

Figure 10:
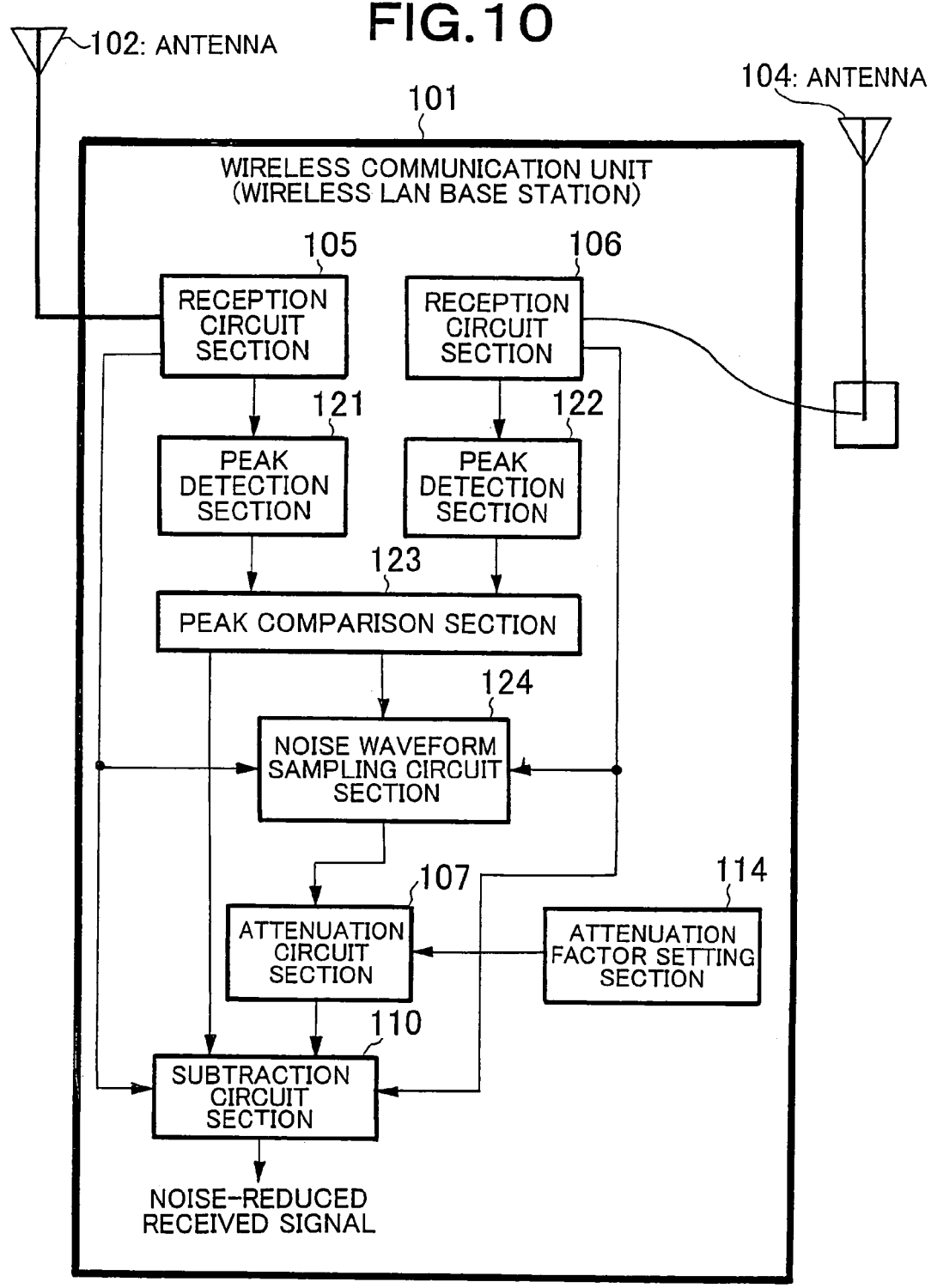
FIG. 10 is a block diagram illustrating the sixth embodiment according to the invention.

FIG. 10 is a block diagram illustrating the sixth embodiment according to the present invention. In FIG. 10, the same sections as those shown in FIGS. 2 and 3 are denoted by the same reference numerals, which sections will not be repeatedly described herein. In the sixth embodiment, even if a noise source cannot be specified, a noise signal is detected and a noise is reduced by locating the antenna 104 at an arbitrary position. In addition, by extracting a noise component and subtracting only the noise component from a received signal from the antenna 102, it is ensured that the noise component is reduced or eliminated. The antenna 104 shown in FIG. 10 is located at an arbitrary position while the noise source cannot be specified. The antenna 104 may not be, therefore, disposed in the vicinity of the noise source 103 differently from FIGS. 2 and 3.

Further, it is unclear which is nearer to the noise source, the antenna 102 or the antenna 104 and both of the antennas 102 and 104 are equal in circuit configuration. The antenna 102 is connected to the reception circuit section 105, and a peak detection section 121 detects a peak having the highest reception level of a signal received at the reception circuit section 105. The antenna 104 is connected to the reception circuit section 106, and a peak detection section 122 detects a peak having the highest reception level of a signal received at the reception circuit section 106.

Figure 11A:
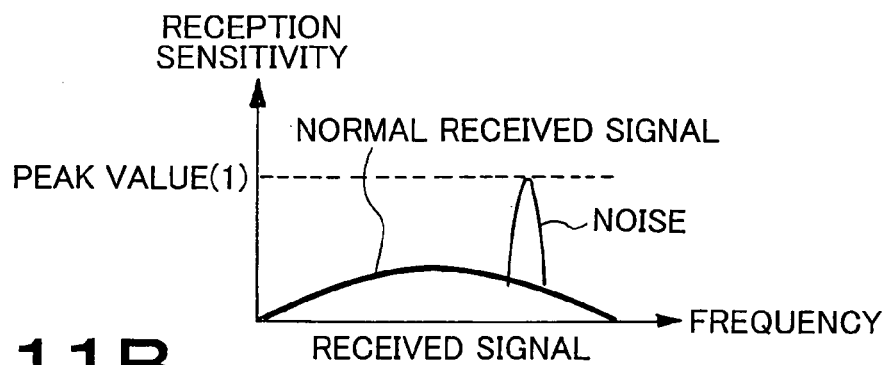
FIGS. 11A and 11B illustrate received signals and noise peaks from antennas 102 and 104 in the sixth embodiment.
Figure 11B:
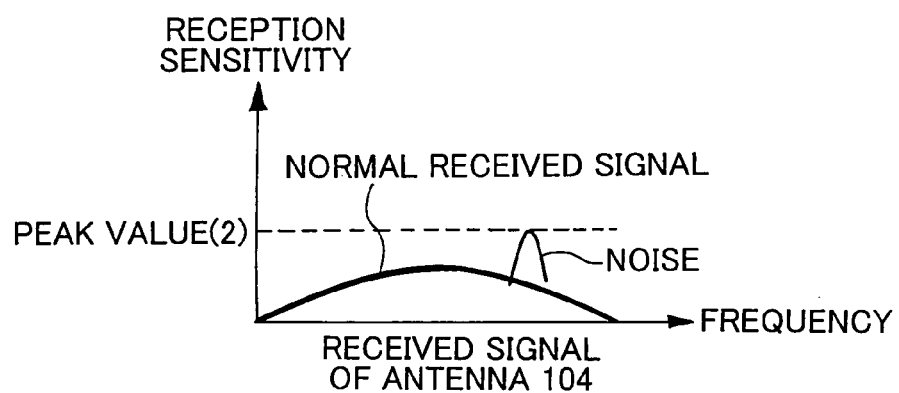

FIGS. 11A and 11B illustrate examples of waveforms of the signals of the reception circuit sections 105 and 106 that receive noise-containing signals from the antennas 102 and 104 and the peaks detected by the peak detection sections 121 and 122. FIG. 11A is for the signal of the reception circuit section 105 that receives the signal from the antenna 102 and FIG. 11B is for the signal of the reception circuit section 106 that receives the signal from the antenna 104.

Figure 12:
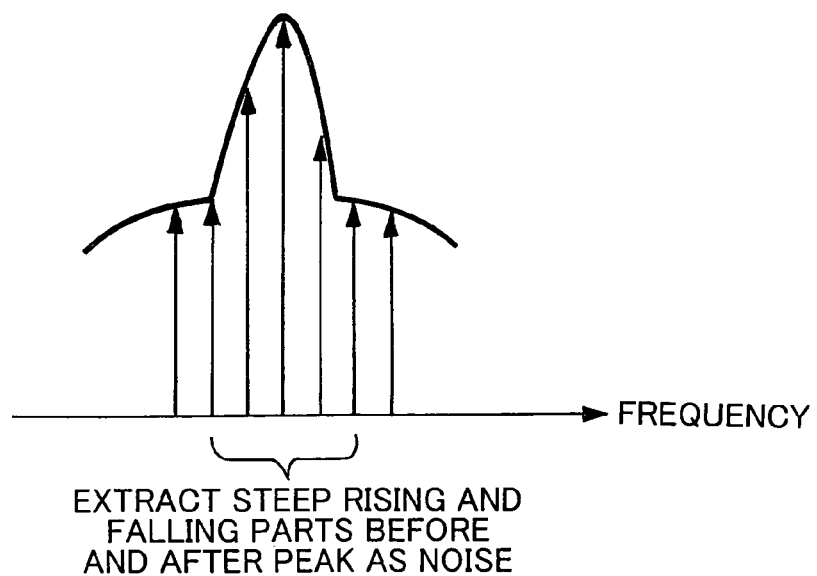
FIG. 12 is an illustration for explaining a noise extraction operation in the sixth embodiment.

A peak comparison section 123 compares the peak detected by the peak detection section 121 with that detected by the peak detection section 122, and outputs the signal having the higher peak to a noise waveform sampling circuit section 124. The noise waveform sampling circuit section 124 extracts steep rising and falling parts before and after the peak as a noise component as shown in FIG. 12, and outputs the extracted noise signal to the attenuation circuit section 107.

An attenuation factor setting is similar to the setting shown in FIG. 2, FIG. 3 or FIG. 8. In this embodiment, it is assumed that the attenuation factor obtained similarly to the unit shown in FIG. 3 is set in the attenuation factor setting section 114. Needless to say, the attenuation factor may be determined similarly to FIG. 2 or FIG. 8. The attenuation circuit section 107 attenuates the noise signal extracted by the noise waveform sampling circuit section 124 at the attenuation factor thus set, and outputs the attenuated noise signal to the subtraction circuit section 110. The subtraction circuit section 110 subtracts an output of the subtraction circuit section 107 from the received signal of the reception circuit section 105, and outputs the noise-reduced received signal. By thus extracting the noise component, attenuating only the noise component, and subtracting the attenuated signal from the received signal of the reception circuit section 105, only the noise component can be reduced.

The noise component in the wireless LAN unit often influences the received signal if a peak of the noise signal is higher than a peak of an ordinary received signal. Using this characteristic, the peak of the received signal from the antenna 102 is compared with that from the antenna 104, the higher peak is selected, and the selected peak is assumed as the peak of the noise signal. Further, to obtain a frequency component of the noise, parts before and after the peak are sampled and only the noise component is extracted.

At this time, the noise component is featured by steep rising and falling before and after the peak as compared with a normal received signal waveform. Using this feature, only the noise can be extracted. The extracted noise signal is attenuated at the predetermined attenuation factor and the attenuated noise signal is subtracted from the received signal having the lower peak, thereby making it possible to reduce only the noise component.

Seventh Embodiment

Figure 13:
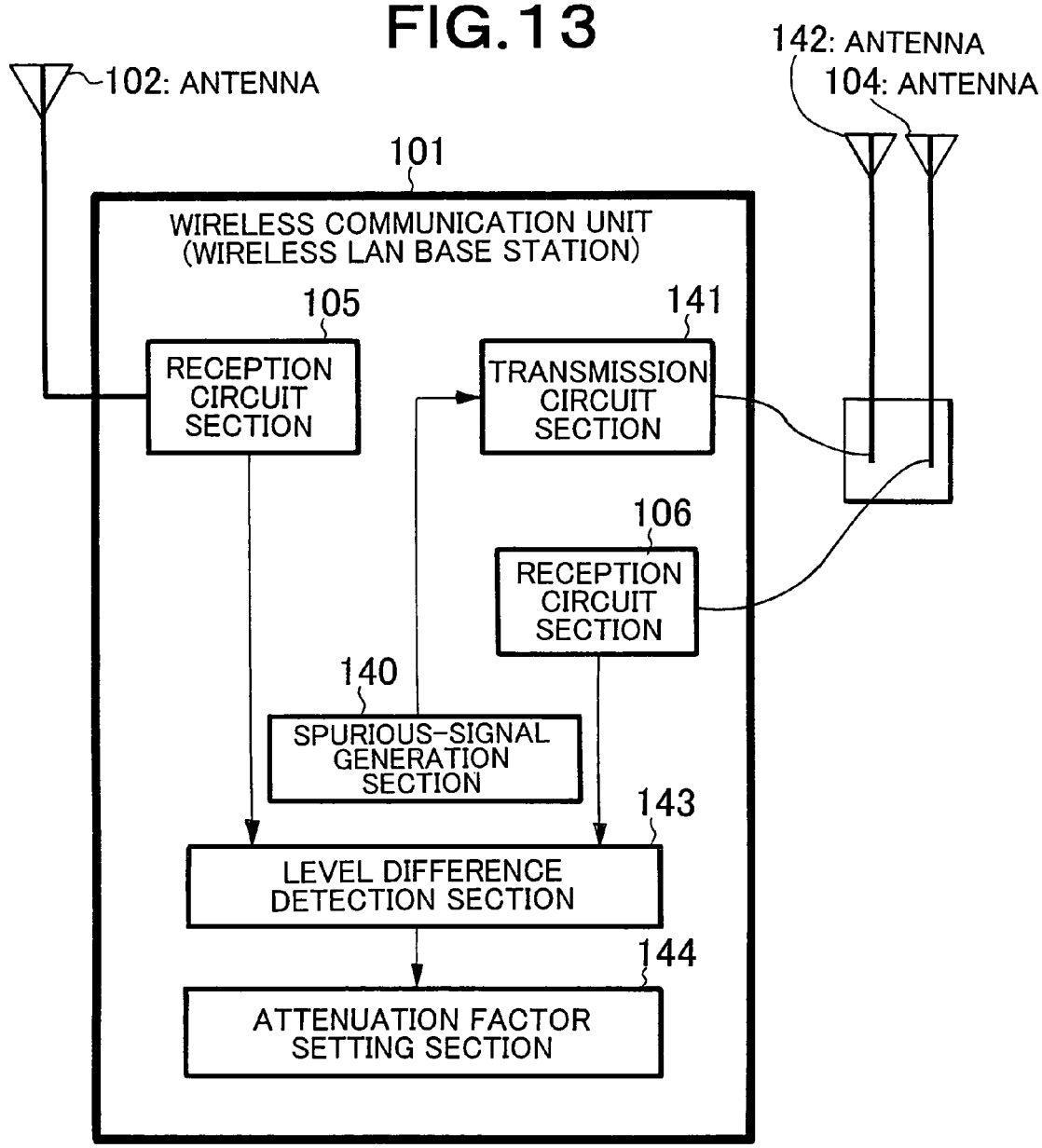
FIG. 13 is a block diagram illustrating the seventh embodiment according to the invention.

FIG. 13 is a block diagram illustrating the seventh embodiment according to the present invention. In FIG. 13, only the configuration related to an attenuation factor setting is shown. The remaining configuration is equal to those in the first embodiment, the second embodiment, and the like. In FIG. 13, a spurious-signal generation section 140 generates a predetermined spurious-signal and outputs the generated spurious-signal to a transmission circuit section 141. The spurious-signal is then transmitted from an antenna 142. The wireless signal transmitted from the antenna 142 is received at each of the wireless signal reception antenna 102 and the noise scanning antenna 104 that is disposed in the vicinity of the antenna 142. The reception circuit sections 105 and 106 amplify the received signals.

A level difference detection section 143 detects a level difference between the received signal of the reception circuit section 105 and the received signal of the reception circuit section 106. An attenuation factor setting section 144 sets an attenuation factor according to the level difference. For example, if the level of the received signal of the reception circuit section 106 is 1 and that of the reception circuit section 105 is 0.5, the attenuation factor is set at 0.5. The seventh embodiment is similar to the first and second embodiments except for the setting of the attenuation factor. In this embodiment, therefore, a noise is reduced or eliminated using the set optimum attenuation factor. As can be seen, in this embodiment, the optimum attenuation factor can be set without the need of setting the distance between the antennas.

Eighth Embodiment

Figure 14:
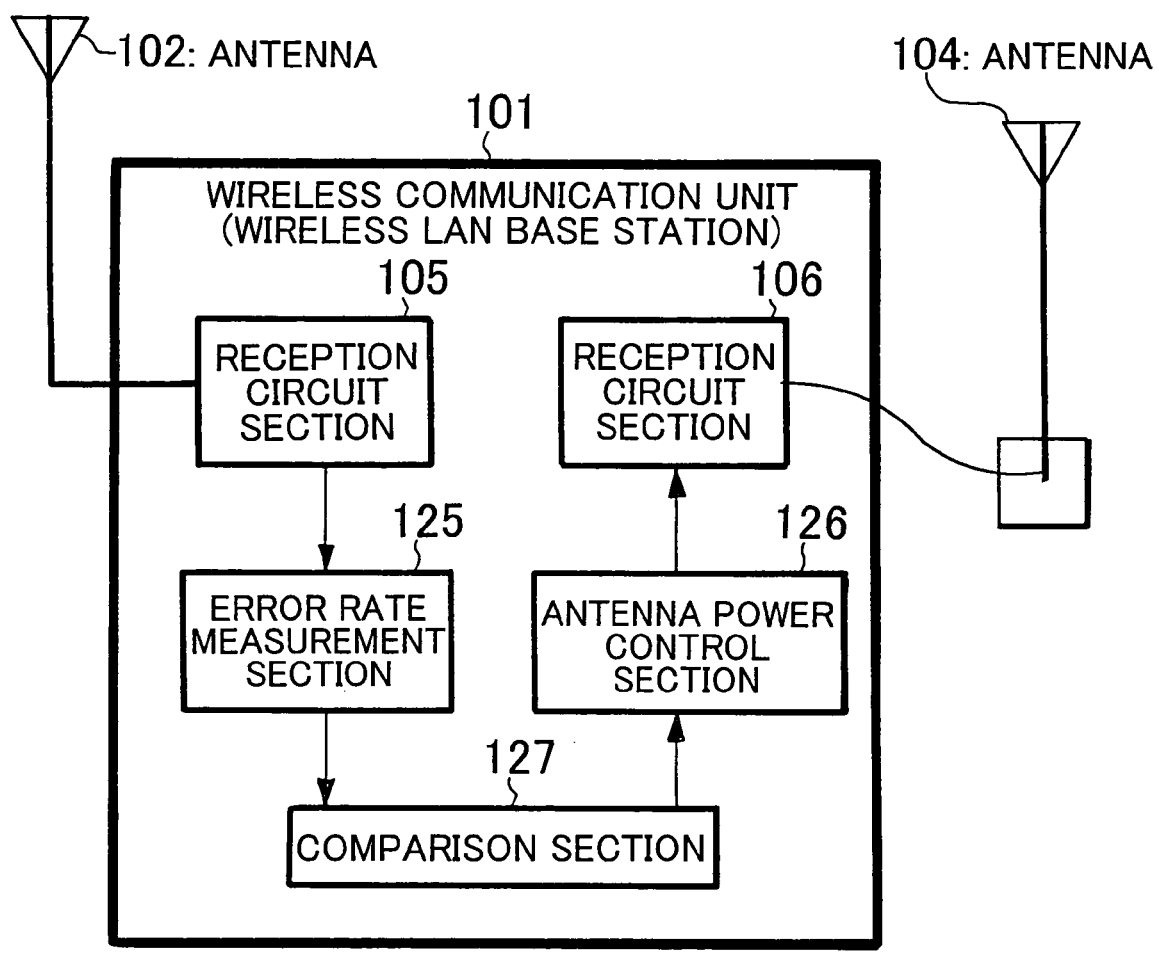
FIG. 14 is a block diagram illustrating the eighth embodiment according to the invention.

FIG. 14 is a block diagram illustrating the eighth embodiment according to the present invention. In FIG. 14, only the configuration of important sections of the embodiment is shown. By mounting the important sections in the wireless communication unit 101 in any one of the first to seventh embodiments, a power saving of the noise scanning antenna 104 is realized. It is assumed herein that the configuration of the important sections in this embodiment is applied to the unit shown in FIG. 2. In FIG. 14, the same sections as those shown in FIG. 2 are denoted by the same reference numerals, which sections will not be repeatedly described herein.

The important sections means herein an error rate measurement section 125, an antenna power control section 126, and a comparison section 127. The antenna power control section 126 that controls the power of the antenna 104 is connected to the reception circuit section 106 connected to the antenna 104. The error rate measurement section 125 that measures an error rate of a received signal of the reception circuit section 105 is connected to the reception circuit section 105 connected to the antenna 102. An error rate measurement method executed by the error rate measurement section 125 is the same as that already described above.

The comparison section 127 compares the measured error rate with a specified value. A permissible error rate is set as the specified value in the comparison section 127 in advance. If the measured error rate is below this specified value, the comparison section 127 notifies the antenna power control section 126 of this comparison result so that the antenna power control section 126 controls the power of the antenna 104 to be turned off. If the error rate exceeds the specified value after turning off the power of the antenna 104, the antenna power control section 126 controls the power of the antenna 104 to be turned on. By thus controlling the power of the antenna 104 and turning off the power of the antenna if the noise level is low, the power saving of the antenna 104 can be realized.

In the wireless communication unit in each of the first to seventh embodiments, the power of the antenna 104 is turned on so as to always scan the noise. Due to this, the power consumption of the wireless communication unit is greater than that of the conventional wireless communication unit in which the antenna 104 is not provided. If the radiation of a noise from the noise source is attenuated, the antenna 104 is unnecessary. Accordingly, the error rate of the antenna 102 is always measured and the comparison section 127 issues an instruction to interrupt the supply of power to the antenna power control section 126 if the measured error rate is below the specified value, thereby turning off the power of the antenna 104 and saving the power of the antenna 104.

If the error rate exceeds the specified value, the comparison section 127 issues an instruction to resume the supply of power to the antenna power control section 126, thereby resuming the supply of power to the antenna 104 and saving the power of the antenna 104 without decreasing the noise reduction effect. In the embodiment shown in FIG. 10, the antenna from which the received signal has the lower peak is similarly controlled based on the comparison result of the peak comparison section 123, whereby a power saving of this antenna can be realized.

In the first to fifth embodiments, one wireless signal reception antenna is normally provided in the wireless communication unit 101. However, even a wireless communication unit having a plurality of antennas provided therein can exert similar control. Namely, if the wireless communication unit has a plurality of antennas provided therein, error rates of received signals from all the antennas are measured and the antenna having the lowest error rate is set as the antenna 102. The error rates may be measured using the above-stated error rate measurement method.

Further, in the embodiment shown in FIG. 10, it is necessary to prepare the antenna 104 other than the normally disposed antenna. However, if a plurality of wireless signal reception antennas are disposed, it is unnecessary to separately prepare the antenna 104. Namely, the antenna the received signal from which has the highest peak among the plural antennas may be set as the antenna 104 and the antenna having the lowest error rate may be set as the antenna 102. The error rates may be measured using the above-stated error rate measurement method.

Moreover, the present invention is applicable to a combination unit having a wireless LAN and a PHS (Personal Handyphone System) included in the same housing. That is, if a wireless LAN base station and a PHS base station are disposed in the same housing, the noise reduction device according to the invention is mounted in each base station, whereby a noise at the base stations can be reduced or eliminated with each other. In this case, the wireless LAN has a different frequency band from that of the PHS. Higher harmonics or the like become a noise source for both the wireless LAN and the PHS since they hold communications at a close distance in the same housing. Accordingly, by mounting the noise reduction device, it is advantageously possible to reduce mutual noises.

As stated so far, according to the present invention, it is possible to ensure reducing or eliminating the noise component contained in the wireless signal even in the wireless network or the like in the bad communication environment in which the noise source is present and it is possible to ensure holding good communication. Further, even if the noise changes or the wireless communication unit is moved, it is possible to always obtain the optimum noise reduction effect. Besides, if the noise level is attenuated, the power saving can be realized by turning off the power of the noise scanning antenna.

What is claimed is:

1. A noise reduction device comprising:
a first antenna which receives a wireless signal;
a second antenna for noise scanning;
setting means for setting an optimum attenuation factor according to a distance between said first antenna and said second antenna;
attenuation means for attenuating a received signal from said second antenna at the optimum attenuation factor; and
subtraction means for subtracting an output signal of said attenuation means from the received signal from said first antenna, and for thereby reducing a noise of the received signal from said first antenna.

2. The noise reduction device according to claim 1, wherein said setting means includes a table which stores data indicating a relationship between a distance between said first antenna and said second antenna and an attenuation factor; and
means for setting the distance between said first antenna and said second antenna,
wherein said attenuation means attenuates a received signal from said second antenna at the attenuation factor which is stored in said table and which corresponds to the set distance.

3. The noise reduction device according to claim 2, wherein said second antenna is disposed near a noise source.

4. The noise reduction device according to claim 2, further comprising:
means for measuring an error occurrence rate of the received signal from said first antenna;
means for comparing the measured error occurrence rate with a preset specified value; and means for turning on and off a power of said second antenna based on a comparison result of said comparison means.

5. A wireless LAN base station apparatus comprising the noise reduction device according to claim 2.

6. The noise reduction device according to claim 1, wherein said second antenna is disposed near a noise source.

7. The noise reduction device according to claim 1, wherein
said optimum attenuation factor setting means measures an error occurrence rate of an output signal of said subtraction means while changing the attenuation factor of said attenuation means, and sets an attenuation factor, at which the measured error occurrence rate is a lowest rate, as the optimum attenuation factor.

8. The noise reduction device according to claim 7, wherein said second antenna is disposed near a noise source.

9. The noise reduction device according to claim 8, further comprising:
means for regularly updating said optimum attenuation factor to a new optimum attenuation factor.

10. The noise reduction device according to claim 1, wherein said setting means includes means for detecting a level difference between a peak of the received signal from said first antenna and a peak of a received signal from said second antenna; and
means for calculating an attenuation factor based on the detected level difference,
wherein said attenuation means attenuates the received signal from said second antenna at the attenuation factor calculated by said calculation means.

11. The noise reduction device according to claim 10, further comprising:
means for measuring an error occurrence rate of the received signal from said first antenna;
means for comparing the measured error occurrence rate with a preset specified value; and
means for turning on and off a power of said second antenna based on a comparison result of said comparison means.

12. A wireless LAN base station apparatus comprising the noise reduction device according to claim 10.

13. The noise reduction device according to claim 1, further comprising:
means for generating a spurious-signal;
a third antenna which is provided near said second antenna and which transmits the spurious-signal; and
means for detecting a level difference between the signal received at said first antenna and the signal received at said second antenna,
wherein said setting means sets an optimum attenuation factor according to the detected level difference.

14. The noise reduction device according to claim 13, further comprising:
means for measuring an error occurrence rate of the received signal from said first antenna;
means for comparing the measured error occurrence rate with a preset specified value; and
means for turning on and off a power of said second antenna based on a comparison result of said comparison means.

15. A wireless LAN base station apparatus comprising the noise reduction device according to claim 13.

16. The noise reduction device according to claim 1, further comprising:
first peak detection means for detecting a peak of the received signal from said first antenna;
second peak detection means for detecting a peak of a received signal from said second antenna;
means for comparing the peak detected by said first peak detection means with the peak detected by said second peak detection means; and
means for extracting a noise component from the received signal having the higher peak based on a comparison result of said comparison means,
wherein said attenuation means attenuates the extracted noise component at the optimum attenuation factor instead of the received signal from said second antenna.

17. The noise reduction device according to claim 16, wherein
said setting means measures an error occurrence rate of an output signal of said subtraction means while changing the attenuation factor of said attenuation means, and sets the attenuation factor, at which the measured error occurrence rate is a minimum rate, as the optimum attenuation factor.

18. The noise reduction device according to claim 16, wherein
said setting means detects a level difference between the peak of the received signal from said first antenna and the peak of the received signal from said second antenna, and calculates the optimum attenuation factor based on the detected level difference.

19. The noise reduction device according to claim 16, further comprising:
means for measuring an error occurrence rate of the received signal from said first antenna;
means for comparing the measured error occurrence rate with a preset specified value; and
means for turning on and off a power of said second antenna based on a comparison result of said comparison means.

20. A wireless LAN base station apparatus comprising the noise reduction device according to claim 16.

21. The noise reduction device according to claim 1, further comprising:
means for measuring an error occurrence rate of the received signal from said first antenna;
means for comparing the measured error occurrence rate with a preset specified value; and
means for turning on and off a power of said second antenna based on a comparison result of said comparison means.

22. A wireless LAN base station apparatus comprising the noise reduction device according to claim 1.

* * * * *